United States Patent

[11] 3,595,250

| [72] | Inventor | Mowatt M. Hurst<br>Menlo Park, Calif. |
|---|---|---|
| [21] | Appl. No. | 720,767 |
| [22] | Filed | Apr. 12, 1968 |
| [45] | Patented | July 27, 1971 |
| [73] | Assignee | Malsbary Manufacturing Company<br>Oakland, Calif. |

[54] AUTOMATIC CARWASH APPARATUS
18 Claims, 17 Drawing Figs.

[52] U.S. Cl. .................................................. 134/45,
118/2, 118/7, 118/323, 134/57, 134/95, 134/181
[51] Int. Cl. ...................................................... B60s 3/04
[50] Field of Search ............................................ 134/45, 58,
123, 178, 180, 181, 57; 15/312, 312.1, DIG. 2;
239/184, 185

[56] References Cited
UNITED STATES PATENTS

| 2,703,579 | 3/1955 | Merancy et al. | 134/123 X |
| 2,732,846 | 1/1956 | Berezny | 134/45 |
| 3,016,559 | 1/1962 | Holtzclaw | 15/312 (.1) |
| 3,190,297 | 6/1965 | Austin | 134/123 |
| 3,245,103 | 4/1966 | King | 15/312 (.1) |
| 3,339,565 | 9/1967 | Williams | 134/123 X |
| 3,349,783 | 10/1967 | Ellis | 134/45 |
| 3,400,727 | 9/1968 | Daum et al. | 134/123 X |
| 3,167,797 | 2/1965 | Hergonson | 134/123 X |
| 3,447,546 | 6/1969 | Burrup | 134/123 |
| 3,474,801 | 10/1969 | Stotts | 134/123 |

FOREIGN PATENTS

| 251,427 | 5/1964 | Australia | 134/123 |
| 1,007,797 | 10/1965 | Great Britain | 134/123 |
| 1,059,920 | 2/1967 | Great Britain | 134/45 |

OTHER REFERENCES
Advertisement— Reverse-O-Matic Car Wash— received in U.S. Patent Office Feb. 12, 1968— Copy in GR. 367— 134/123

*Primary Examiner*—Daniel Blum
*Attorney*—Schapp and Hatch

ABSTRACT: An automatic carwash apparatus of the type having a spray carriage moving around the vehicle on an oblong overhead tract. The apparatus is formed to spray cleaning liquid against the vehicle in varying ways to provide more effective cleaning action on hard-to-clean surfaces, such as the front and rear ends, the entire device acting automatically to apply a preconditioner spray as the vehicle enters, wash and then rinse the vehicle, applying wax or other finish conditioners during the rinse operation. Both the preconditioner and wash sprays are formed to vary the angle of impingement. The various functions of the apparatus operate sequentially in response to entry of the vehicle into the apparatus and in response to the position of the spray carriage relative to the vehicle. Means is provided for automatically accepting money to initiate the operational cycle so that the apparatus may be left to operate without attendants.

INVENTOR.
MOWATT M. HURST
BY
Schapp & Hatch
ATTORNEYS

INVENTOR.
MOWATT M. HURST
BY
Schapp & Hatch
ATTORNEYS

AUTOMATIC CARWASH APPARATUS

BACKGROUND OF THE INVENTION

This invention relates to improvements in automatic carwash apparatus, and more particularly to carwash apparatus wherein cleaning is effected by impinging sprays of cleaning liquids and rinsing liquids against the vehicle from a spray carriage traversing an oblong track generally surrounding the vehicle.

Apparatus for washing automotive vehicles is ordinarily classified into manually and automatically operated types. Until comparatively recently, the automatic types generally have pulled the vehicle through a wash tunnel where it was sprayed with cleaning liquid, passed between revolving brushes to scrub off dirt, rinsed off and at least partially dried in a blast of heated air. Manually operated carwashes, on the other hand, have involved spraying a cleaning liquid onto the vehicle, scrubbing the vehicle surface with a hand mitt, sponge or the like, spraying the vehicle with a rinse liquid and wiping off most of the liquid with a chamois or towel.

Recently, improved detergent cleaning compounds have become available which make it possible to eliminate the scrubbing step, and water conditioners have become available which make it possible to allow the car to dry naturally without spotting, thus eliminating the drying step.

As a consequence of eliminating the scrubbing and drying steps, it is now possible to provide carwash apparatus which cleans the vehicle by impinging it with sprays of cleaning liquid followed by sprays of rinsing liquid, the vehicle being allowed to dry by evaporation. Such apparatus has made it possible to produce a completely automatic carwash capable of functioning in a reliable manner while completely unattended. This, of course, eliminates much of the labor cost previously involved in the washing of vehicles.

Known automatic carwash devices usually consist of a spray arch which passes longitudinally over the vehicle, or a spray carriage which moves along an oblong track positioned in surrounding relation to the vehicle. In either type of apparatus, problems are encountered in achieving effective cleaning action of the dirtier portions of the vehicle without wasting undue amounts of cleaning liquid on the cleaner areas.

The economic value of the apparatus is directly related to the number of vehicles it can clean in a working day. For this reason, the apparatus should complete its cleaning and rinsing cycles as quickly as possible so as to free the apparatus to accommodate the next vehicle. Also, since the apparatus is intended for use by any motorist desiring to have his vehicle washed, and since no attendant will normally be present when the apparatus is in use, it is necessary that the various functions be carries out in a foolproof and efficient manner by control apparatus not subject to environmental hazards.

SUMMARY OF THE INVENTION

The automatic carwash apparatus of the present invention effects a relative movement between a spray means and the vehicle to be washed. Control means is incorporated which is responsive to this relative movement to provide a more effective cleaning action at certain desired portions of the vehicle, such as the front and rear ends. For this purpose, the control means is effective to vary the force, direction and/or amount of liquid being sprayed against the vehicle as the spray impinges the different areas where increased or decreased washing effectiveness is desired.

The present invention also utilizes the time the vehicles spend in entering the apparatus to apply a spray of preconditioning liquid which initially loosens dirt and road grime for more effective cleaning during the cleaning and rinsing cycles of the apparatus. The various components operate sequentially in a positive manner and are interlocked in such manner that the apparatus will not function unless the vehicle is properly positioned. The effectiveness of the preconditioning spray is improved by pointing it toward the vehicle approaching the preapplication spray means, and by pointing the preapplication spray in the direction of movement of the vehicle as it proceeds therepast.

The entire operation of the automatic carwash is initiated by the motorist depositing the correct amount of money in a money accepting device. As the vehicle reaches "wash" position, the preconditioning spray is turned off and the operation of the spray means to provide wash and rinse liquid as described is initiated, the operation of the spray means being maintained by detecting the continued presence of the car at the proper location. At the end of the desired washing and rinsing cycles, the apparatus automatically releases the vehicle to permit egress from the apparatus and resets itself for the next vehicle.

Accordingly, it is a principal object of the present invention to provide a carwash apparatus capable of cleansing and rinsing the exterior surface of a vehicle automatically and in a rapid and efficient manner.

Another object of the present invention is the provision of a carwash apparatus which impinges sprays of washing and rinsing liquids on the surfaces to be washed at various angles effective to provide improved cleansing and rinsing action.

A further object of the invention is to provide an apparatus of the character described which will selectively vary the amount of liquids sprayed against different portions of the vehicle for more effective cleansing of surfaces requiring same, such as the front and rear ends, and for conserving the liquids by reducing the quantity sprayed on areas other than those requiring the more effective cleansing action.

A still further object of the present invention is to provide an apparatus of the character described which is responsive to relative movement of the spray means and vehicle to provide the more effective cleansing action on desired areas.

Another object of the invention is the provision of apparatus of the type described which incorporates control means effective to vary the amount of liquid sprayed through a spray means whenever the spray means is located so that the spray emanating therefrom impinges hard to clean surfaces requiring a more effective cleansing action.

A further object of the invention is to provide apparatus of the character set forth in which the spray means reciprocates back and forth in swinging fashion for constantly changing the angle of impingement.

A still further object of the present invention is to provide apparatus of the type set forth which utilizes a spray carriage moving around the vehicle on an oblong track, with movement of the carriage along the track operating a valving system for selectively applying wash, rinse, conditioner, wax and like liquids to the vehicle.

Yet another object of the invention is to provide an apparatus of the character set forth which incorporates a preapplication spray for initial loosening and dissolving of dirt and road scum as the vehicle enters the apparatus.

Still another object of the invention is to provide an apparatus of the character described having a preapplication spray and in which the preapplication spray is directed toward the front of the vehicle as it enters the apparatus and in the direction of movement of the vehicle as it moves on past the preapplication spray.

Further objects and advantages of the present invention will become apparent as the specification progresses and in the claims appended thereto.

BRIEF DESCRIPTION OF THE DRAWINGS

The preferred form of the invention is illustrated in the accompanying drawings, forming part of this application, in which.

3

While only the preferred form of the present invention is shown here, it should be understood that various changes or modifications may be made within the scope of the claims attached hereto without departing from the spirit of the invention.

DESCRIPTION OF THE PREFERRED EMBODIMENT

Referring now to the drawings in detail, the carwash apparatus of the present invention is seen to include spray means 21 formed for directing a spray of liquid 22 against an object 23 to be washed, guide means 24 formed for effecting relative movement of the spray means 21 and the object 23 in such manner that the spray of liquid 22 will traverse desired areas of the object, and control means 26 responsive to such relative movement for causing the spray means 21 to provide a more effective cleansing action on desired portions of the object 23, such as the front end 27 and/or rear end 28.

As here shown, the present apparatus is particularly suited for washing automotive vehicles and is formed and arranged so that the vehicle may be driven into a "wash" position, and be driven out when the wash cycle is completed. For this purpose, the guide means 24 includes an overhead oblong track 29 supported in generally encircling relation to the vehicle, by any suitable structure, such as posts 31, and the spray means 21 is mounted on a carriage 32 adapted to move along the track 29 and circumnavigate the vehicle 23.

In order to achieve a positive controlling action not subject to environmental hazards, the control means 26 is preferably mechanical in nature. Thus, the control means 26 here includes a valving system adapted to vary the quantity of liquid being sprayed onto hard-to-wash areas of the vehicle through the spray means 21 in response to the position of the spray means with respect to such areas of the vehicle, where the more efficient washing action is desired. Actuation of the valving system to increase or decrease the quantity of liquid being sprayed is accomplished in response to the movement of the valving system relative to actuating elements 34.

4

Figures 3, 4, 5, 6:
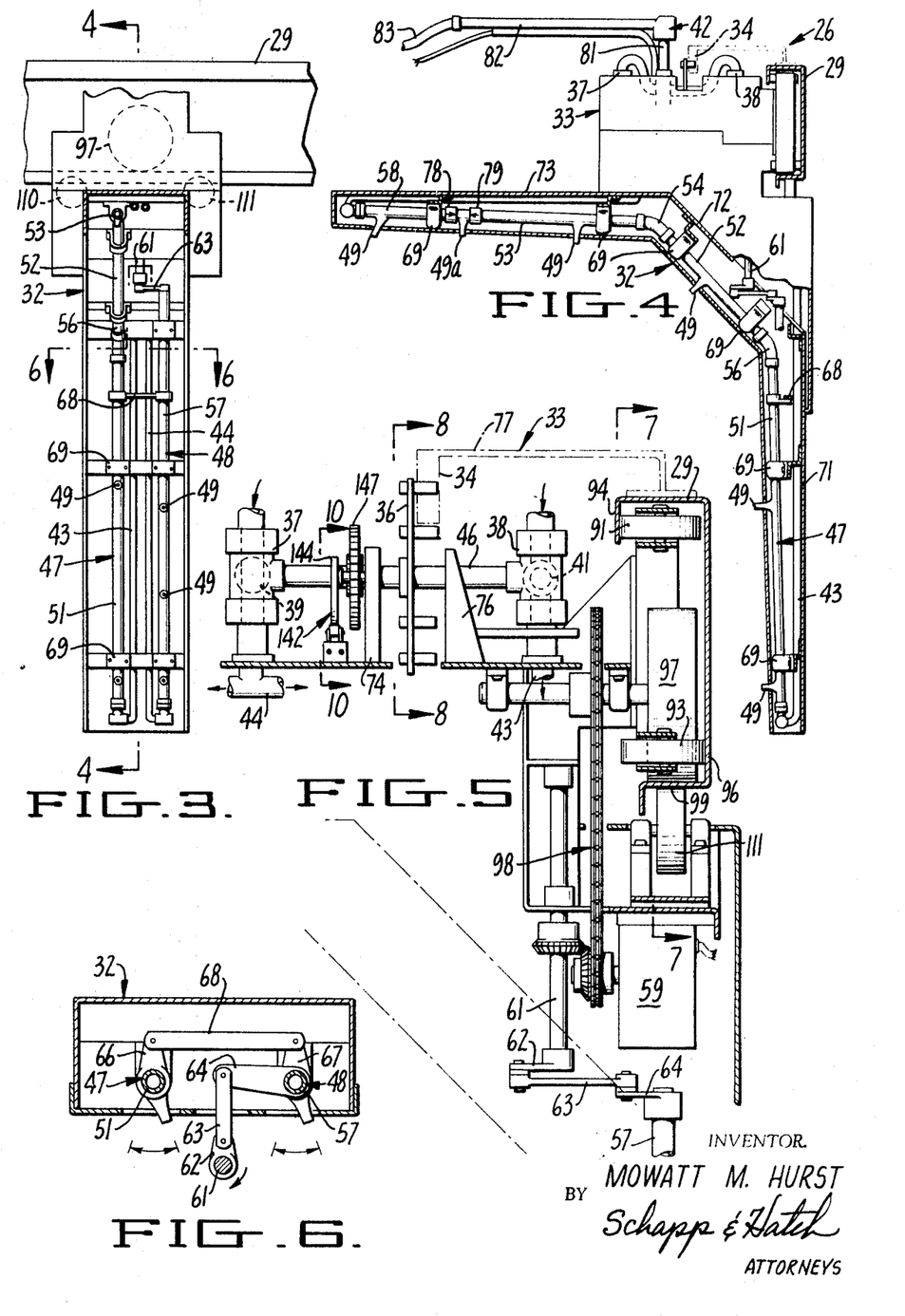
FIG. 3 is an enlarged cross-sectional view taken substantially on the plane of line 3—3 of FIG. 2.
FIG. 4 is a vertical cross-sectional view taken substantially on the plane of line 4-4 of FIG. 3.
FIG. 5 is an enlarged fragmentary view of a spray carriage and associated control apparatus, portions being broken away and shown in section for clarity of illustration.
FIG. 6 is an enlarged cross-sectional view taken substantially on the plane of line 6-6 of FIG. 3.
Figure 8:
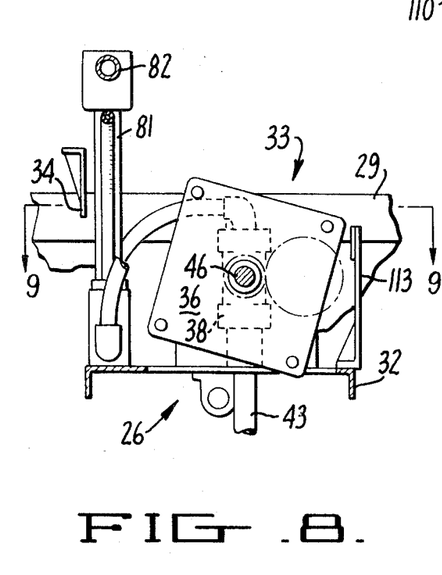
FIG. 8 is a cross-sectional view taken substantially on the plane of line 8-8 of FIG. 5.
Figure 9:
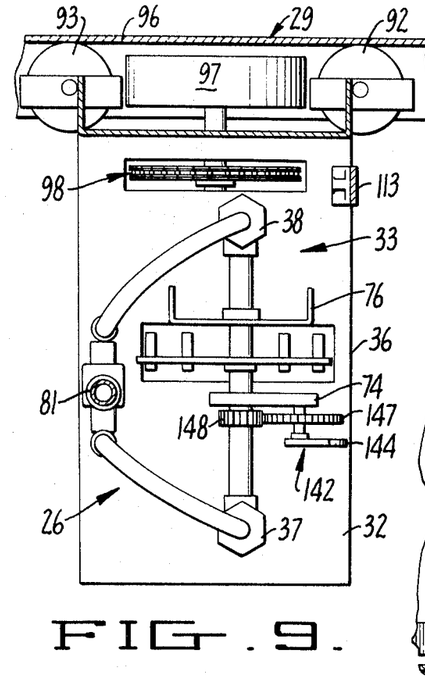
FIG. 9 is a cross-sectional view taken substantially on the plane of line 9-9 of FIG. 8.

As shown in FIGS. 5, 8 and 9 of the drawings, the valving system 33 includes a pair of valves 37 and 38 of a type which may be turned on and off by a 90° rotation, in either direction, of their valve members 39 and 41 respectively. Valves 37 and 38 both have their inlet sides connected to a liquid supply line 42, and have their outlet sides connected to conduits 43 and 44 which lead to the spray means 21. The valves 37 and 38 are here shown as being of the spherical plug type, and the spherical plug valve members 39 and 41 are connected for joint rotation to a star wheel 36 by a shaft 46.

The star wheel 36 is secured to shaft 46 for joint rotation when the star wheel is rotationally displaced by the actuating elements 34. The openings through the valve members 39 and 41 are positioned at right angles to each other so that valve 37 will be open when valve 38 is closed and vice versa. The star wheel 36 is provided with four points, causing it to be displaced 90° each time it passes an actuating element 34. This, of course, rotates shaft 46 and attached valve members 39 and 41 a quarter turn, shutting off one valve and simultaneously turning on the other valve.

It is well known that the front and rear ends of an automobile or the like are usually much harder to clean than the sides and top. This is because the front end of the vehicle encounters bugs, dirt, road scum and other material much more frequently and with more impact than do the other portions of the vehicle. Likewise, the rear end of the vehicle often is harder to clean because of material thrown up from the roadway by the tires, exhaust fumes emanating at the rear of the vehicle, and the curling back or "burbling" action of the airflow and entrained materials over the vehicle. The present apparatus provides a more effective cleaning action at hard-to-clean areas, such as the front and rear ends, by increasing the quantity of liquid impinging upon such areas from the spray means 21. The present apparatus also reduces the quantity of liquid as the spray from the spray means 21 is directed against the easier to clean areas, such as the sides and roof. This effects quite substantial savings in cleaning liquid (usually a mixture of hot or cold water and detergent) and in cleaning time.

By far the largest number of vehicles in use today are ordinary passenger automobiles. The front and rear ends of these automobiles usually present a different configuration than do the sides and midportion, and decorative sheet metal is often employed in such manner as to increase washing problems. Therefore, the present apparatus provides a different spray pattern at the ends of the vehicle being washed than at the sides and midportion. Basically, the spray pattern at the ends of the vehicle is more concentrated in the lower sector and is angled in the upper sector to provide good cleaning of the windshield, rear window, hood and trunk deck areas, while spray pattern at the sides and roof is more evenly distributed.

To accomplish the described changing of the spray patterns, the apparatus is here provided with a plurality of spray manifolds 47 and 48 selectively connectable to the source of cleaning or rinsing liquid through conduits 43 and 44, respectively. Each of the spray manifolds 47, 48 is provided with a plurality of spray nozzles 49, these nozzles being arranged differently on manifold 47 than on manifold 48 so as to provide a different spray pattern. As may be seen in FIGS. 3, 11 and 12, the arrangement of sprays coming from manifold 47 is different than from manifold 48. This results in different spray patterns depending upon which manifold is being supplied with liquid.

Figure 11:
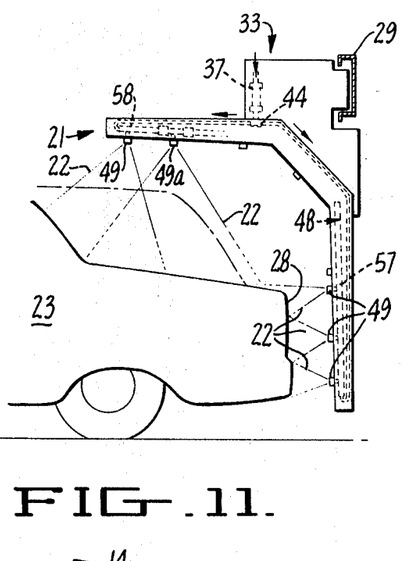
FIG. 11 is a schematic depiction of a spray carriage forming a portion of the automatic carwash of the present invention shown in operating relation to an end of a vehicle being washed.

FIG. 11 illustrates a typical spray pattern for the front and rear ends of automotive vehicles such as passenger cars and station wagons. Because of the tendency of insects and road splash to accumulate on the grill and surrounding areas of the vehicle, and because of the tendency of dirt, road scum and exhaust fumes to accumulate on the lower rear portion of the vehicle, the spray pattern for the vehicle ends preferably provides a concentration of sprays at the lower portion, say the lower half of the vehicle. This concentration of sprays provides improved cleaning action and directs increased quantities of liquid onto these hard-to-clean areas.

Figure 12:
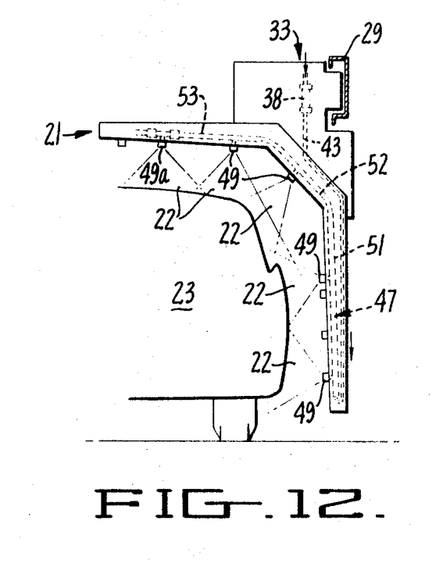
FIG. 12 is a view similar to that of FIG. 11, but showing the spray carriage in operative relation to a side of a vehicle being washed.

FIG. 12 illustrates a typical spray pattern for the roof and side areas of automotive vehicles such as passenger cars and station wagons, wherein the spray pattern is distributed more evenly. In both cases, the spray nozzles are formed and angled to provide fan-shaped sprays affording substantially line contact with the area of the vehicle being impinged.

In order to provide the desired spray pattern, spray manifold 47 is articulated in the manner best seen in FIG. 4 of the drawings. As there shown, manifold 47 includes vertical, slant and horizontal portions 51, 52 and 53, respectively, which are joined together by flexible elbows 54 and 56. Spray manifold 48 consists of two sections, one section 57 corresponding generally to and positioned alongside vertical section 51 of manifold 47, and the other section 58 connected to and forming an extension of horizontal section 53 of manifold 47.

In accordance with the present invention, the angle at which the sprays of liquid 22 impinge against the vehicle is varied as the carriage 32 travels along track 29. This provides an overall improvement in washing action which allows the carriage to move along the track faster than if the angle of impingement were not varied, significantly cutting down the time it takes the apparatus to complete its washing and rinsing cycles and the amount of liquid used. This, in turn, makes it possible to accommodate more vehicles in a working day at less cost and consequently increases the revenue derived from the apparatus.

As here shown, the varying of the angle of impingement of the sprays 22 against the vehicle 23 is accomplished by reciprocating the sprays back and forth. This is achieved by oscillating the spray nozzles 49 around the longitudinal axis of the manifolds 47 and 48 upon which they are mounted. Preferably, the described reciprocation is imparted to the manifolds by a mechanical connection to the power means 59 provided for driving the carriage 32 around the track 29.

As may best be seen in FIGS. 3, 4, 5 and 6 of the drawings, the power means 59 is here in the form of an electric motor geared to a vertical shaft 61 having a crank arm 62 at its lower end connected by a link 63 to a crank arm 64 secured to the upper end of spray manifold section 57. Motor 59 rotates shaft 61 and crank arm 62, acting through link 63 and crank arm 64, reciprocates spray manifold section 57 about its longitudinal axis through a desired arc. Spray manifold 47 is connected for joint reciprocation to spray manifold 48 by means of arms 66 and 67 secured to manifold sections 51 and 57 respectively and interconnected for joint movement by a link 68. In order to permit the desired swinging back and forth of the spray manifolds 47 and 48, their rigid sections are journaled in suitable bearings 69 mounted on vertical 71, slant 72, and horizontal extensions 73, respectively, of carriage 32, flexible elbows 54 and 56 serving to transmit the reciprocating swinging movement between the rigid sections of the manifolds.

In accordance with the present invention, the valving system 33 is operated to control the supply of liquid to one or the other of the manifolds 47, 48 by movement of the carriage means past the actuating elements 34 which are positioned at predetermined stations along the track 29. In the form of the invention illustrated, the valving system 33 is mounted on the carriage 32 and the actuating elements 34 are secured to the track 29 at the desired locations. Thus, operating shaft 46 of the valving system is journaled in brackets 74 and 76 secured to the upper side of carriage extension 73, and the actuating elements 34 are secured by bracket arms 77 to the upper surface of track 29 in position to intercept and rotate star wheel 36.

When valve 37 is open liquid is supplied through conduit 44 to sections 57 and 58 of manifold 48. The liquid under pressure passes from section 58 through check valve 78 to nozzle 49a. When valve 38 is open, liquid is supplied through conduit 43 to spray manifold 47. The liquid under pressure passes from section 53 of spray manifold 47 through a check valve 79 which also is connected to nozzle 49a. Thus, opening of valve 37 or 38 will cause the liquid to pass through different sets of spray nozzles 49, with the exception of nozzle 49a, which is fed from both manifolds and consequently remains on in both spray patterns. Liquid under pressure is supplied from any suitable source, such as a pump 50 through liquid supply line 42 to the inlet sides of valves 37 and 38.

Figure 16:
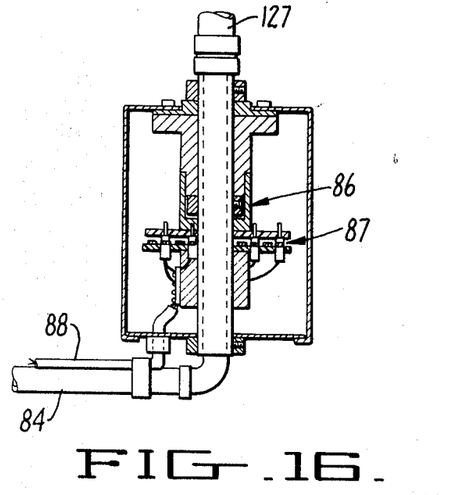
FIG. 16 is a cross-sectional view taken substantially on the plane of line 16-16 of FIG. 2.

As here shown, liquid supply line 42 includes an upstanding portion 81 branching at its lower ends to connect to the intake sides of valves 37 and 38 and having a horizontal extension 82 pivotally connected to the upper end of pipe 81. The distal end of extension 82 is connected by a flexible hose 83 to a horizontally extending pipe 84 of a swivel fitting 86 located centrally of track 29. As may be seen in FIG. 16 of the drawings, swivel fitting 86 is also provided with brush and commutator means 87 swivelably connecting an electrical supply conduit 88 for motor 59 to the other elements of the electrical system.

Figure 7:
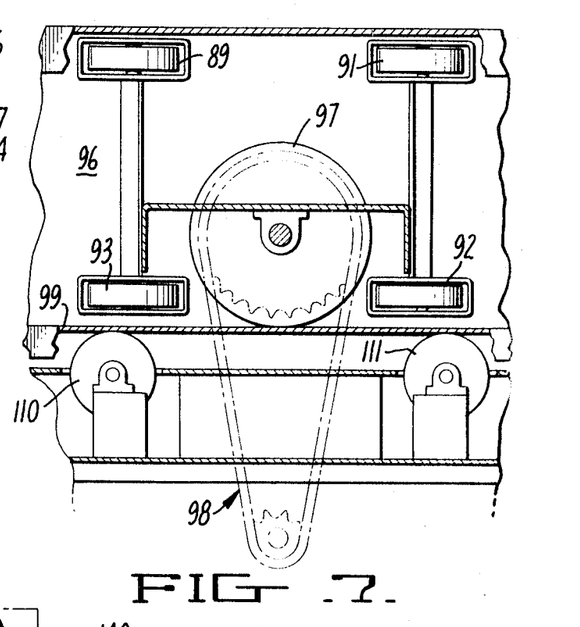
FIG. 7 is a cross-sectional view taken substantially on the plane of line 7-7 of FIG. 5.

In addition to providing the desired oscillating action to the spray manifolds 47 and 48, motor 59 also drives carriage 32 along track 29. As may be seen in FIGS. 5, 7 and 9, carriage 32 is provided with vertically and horizontally spaced attitude wheels 89, 91, 92 and 93. The upper pair of wheels 89 and 91 engage the inner surface of a depending flange 94 formed around the inner periphery of the upper edge of track 29. Wheels 92 and 93 engage the inner surface of the main vertical web 96 of track 29, and the attitude wheels 89, 91, 92 and 93 cooperate to maintain the carriage in the position illustrated in the drawings as it travels around track 29.

The weight of carriage 32 and the components mounted thereon is supported by a large wheel 97 which serves as a drive wheel and which is operatively connected to motor 59 by a conventional chain and sprocket drive mechanism 98. The weight of the carriage forces wheel 97 into driving engagement with a horizontal inturned flange 99 at the lower edge of web 96, and a pair of backup wheels 110 and 111 are mounted on the carriage 32 and bear against the underside of flange 99 to insure that the wheel 97 remains in driving contact with flange 99 at all times.

As a feature of the present invention, a second control means is provided for directing any one, or more, of a plurality of desired liquids through the spray means 21. During the washing phase of the operation of the apparatus, a cleaning compound such as a detergent is usually added to the water being sprayed on the vehicle. During the rinsing operation, various liquids such as spray waxes, spot preventers, etc. are often added to the rinse water. The addition of such liquids to the rinse water is accomplished by this second control means, which here includes valving system 112 formed for actuation to supply selected liquids to spray means 21 by movement of the carriage 32 along track 29.

Figure 13:
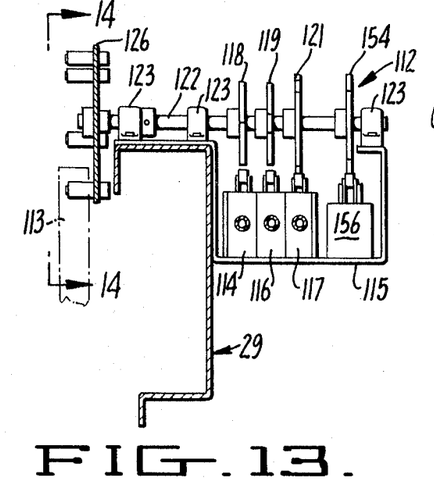
FIG. 13 is a vertical cross-sectional view through a track forming a portion of the automatic carwash of the present invention and illustrating in side elevation a valving system forming part of the apparatus.
Figure 14:
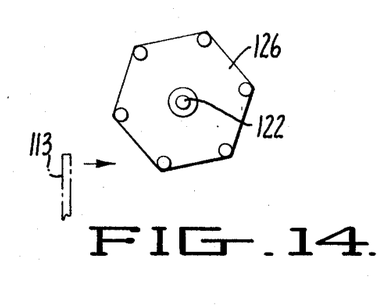
FIG. 14 is a cross-sectional view taken substantially on the plane of line 14-14 of FIG. 13.
Figure 15:
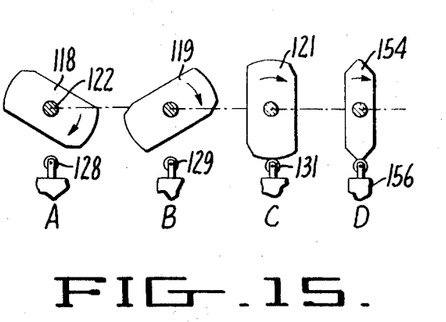
FIG. 15 is a schematic view of a plurality of cams and followers forming part of the valving apparatus of FIG. 13 and showing relative positioning of the cams.

As may best be seen in FIGS. 13, 14 and 15 of the drawings, the valving system 112 is supported in fixed position relative to track 29, and an actuating element 113 is mounted on the carriage in position for interception and actuation of the second valve means as the carriage passes. The valving system 112 here includes a plurality of valves 114, 116 and 117 arranged side-by-side on a support member 115 attached to track 29. Each of the valves 114, 116 and 117 is adapted to be actuated selectively from closed position to open position by depressing a spring-loaded cam follower. A plurality of cams 118, 119 and 121 are mounted on a camshaft 122 in operative alignment with the cam followers 128, 129 and 131 of valves 114, 116 and 117, respectively. Shaft 122 is journaled in bearings 123 mounted on member 115. A star wheel 126 is secured to the end of camshaft 122 so that rotation of the star wheel will rotate the camshaft and the cams secured thereto. Rotation of camshaft 122 causes the cams 118, 119 and 121 to operate their respective valves which are adapted for connection between sources of the desired liquids and the supply line 127 leading to swivel fitting 86. Thus, the particular liquid or liquids being supplied to the spray means 21 at any one time will depend upon the relative position of cams 118, 119 and 121 relative to the cam followers 128, 129 and 131 which actuate the valves 114, 116, and 117 respectively.

In accordance with the present invention, a preapplication spray is mounted in the path of a vehicle entering the carwash apparatus for softening and loosening dirt on the vehicle before operation of the spray means 21. The preapplication spray is responsive to movement of the vehicle therepast to operate the preapplication spray only when the vehicle is in position to be impinged thereby.

As a further feature of the invention, the preapplication spray is provided by spray means 132 formed to direct the preapplication spray against the end of the vehicle facing the preapplication spray means. This is accomplished by directing the preapplication spray toward the vehicle in a direction opposite to its direction of movement of the vehicle as it approaches the preapplication spray means 132 and toward the vehicle in the same direction as the direction of movement of the vehicle as it moves away from the preapplication spray means 132. As here shown, the preapplication spray means 132 includes a pair of manifolds 133 and 134, each of which is of inverted U-shape to provide an arch through which the vehicle may be driven into wash position. The manifold 134 is provided with spray nozzles 136 pointing toward the vehicle, but inclined at an angle so the spray will be projected against the front end of the vehicle as it approaches. The spray nozzles 137 on manifold 133 are inclined in the other direction so the spray therefrom will be projected against the rear of the vehicle as it moves on through the arch.

Figure 17:
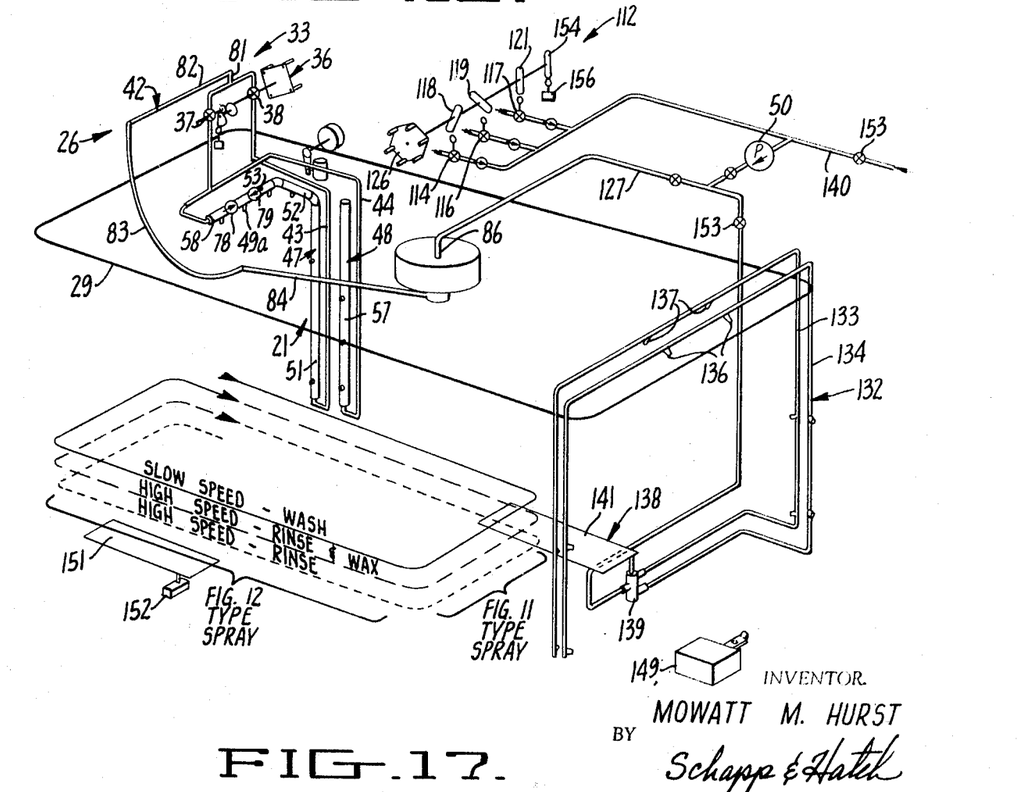
FIG. 17 is a schematic perspective illustrating the operative relationship of control elements to the apparatus and BRIEF typical cycles of operation.

Preapplication spray control means 138 is provided for selectively supplying the preapplication liquid to manifolds 133 and 134 in response to the movement of the vehicle past the manifolds. The control means 138 here includes a two-way valve 139 adapted for connection to a source of preapplication spray liquid under pressure, here pump 50, for selectively supplying such liquid to manifold 134 when a treadle 141 is deflected by the weight of a vehicle, and supplying the liquid to manifold 133 when treadle 141 is not so deflected. As may be seen in FIG. 17 of the drawings, the treadle 141 is positioned so that a front wheel of the vehicle will deflect the treadle downwardly soon after the front portion of the vehicle has passed through the arch defined by the manifolds 133, 134. Thus, preapplication liquid will be sprayed on the vehicle from manifold 134 as it approaches and passes partially through such arch, until it deflects treadle 141, at which time valve 139 will switch the supply of liquid over to manifold 133.

Figure 10:
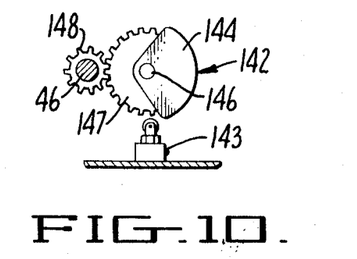
FIG. 10 is a cross-sectional view taken substantially on the plane of line 10 10-10 of FIG. 5.

In order to obtain maximum washing efficiency and flexibility of operation, the present apparatus incorporates a control device 142 responsive to the movement of the carriage 32 around the vehicle for causing the spray means 21 to direct the spray of washing liquid against the vehicle during one complete circuit and a spray of rinsing liquid against the vehicle thereafter. As shown in FIGS. 5 and 10 of the drawings, the control device 142 includes a switch 143 operated by a cam 144 secured to a jack shaft 146 having a spur gear 147 meshed with a pinion gear 148 secured to shaft 46. Rotation of shaft 46 by star wheel 36 imparts a corresponding rotation through the described gear system to cam 144 for selectively operating switch 143 in accordance with the number of times the star wheel 36 is actuated by the elements 34.

Figure 1:
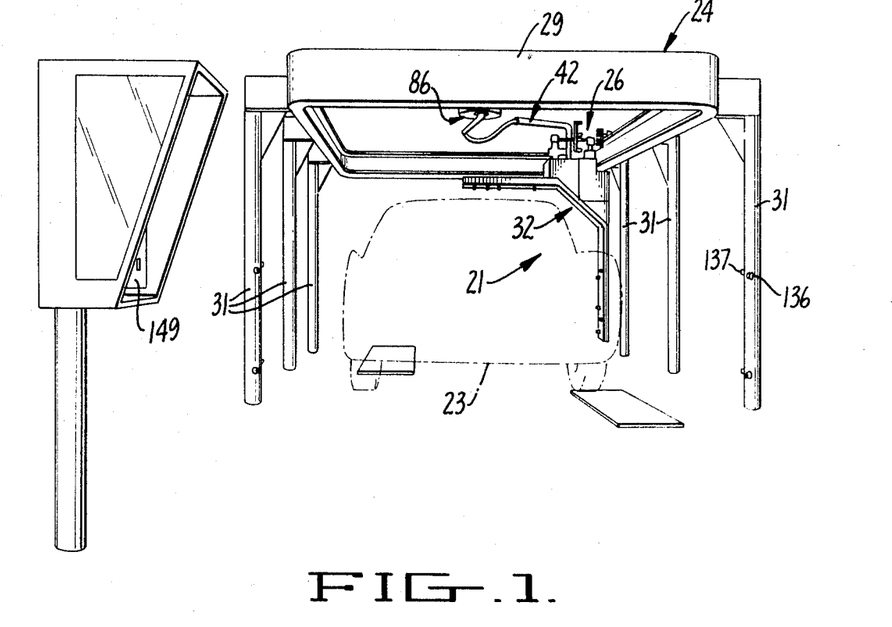
FIG. 1 is an end perspective view of an automatic carwash constructed in accordance with the present invention.
Figure 2:
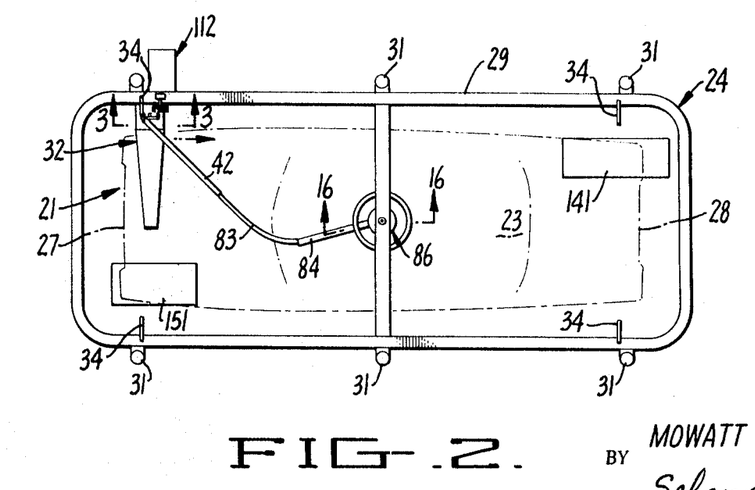
FIG. 2 is a plan view of the automatic carwash of FIG. 1.

As shown in the drawings, each circuit of track 29 by carriage 32 causes star wheel 36 to encounter four of the actuating elements 34 located on the long runs of the track near the corners, see FIG. 2. Since the star wheel 36 has four points, a complete circling of the vehicle by the carriage results in one complete revolution of shaft 46. Gear 147 makes one revolution for three revolutions of gear 148, and this causes cam 144 to describe one-third of a complete revolution for one complete revolution of shaft 46. Cam 144 has a dwell area of 120° and is positioned on shaft 146 in such manner that switch 143 is closed during the first complete trip of the carriage around the vehicle and is open for the next two complete trips.

Drive motor 59 is of the two-speed type and is operatively connected to and controlled by switch 143. During the dwell period of cam 144, switch 143 causes motor 59 to assume its slower speed. Experience has shown that a good washing action may be obtained by selecting a slow motor speed which will cause the carriage 32 to circumnavigate track 29 in approximately one minute. At the end of the first complete trip of the carriage around the vehicle, cam 144 no longer maintains switch 143 in closed position and this causes motor 59 to assume its faster mode of operation. Experience has shown that a fast speed of approximately twice the low speed will provide a good rinsing action, the carriage moving twice as fast as during the wash circuit and hence completing the preferred two rinse circuits around the vehicle during the second minute.

In order to make the operation of the present apparatus completely automatic and eliminate any necessity for an attendant, a conventional money acceptor means is mounted in convenient position for operation by a motorist desiring to utilize the apparatus. The money acceptor means 149 initiates the operative cycle of the carwash apparatus by starting the pump 50 to supply liquid to the preapplication spray manifold 134, conditioner being added to the water from a suitable source through line 140 connected to the intake of pump 50. The motorist then drives his car into the apparatus, and the weight of the car deflecting the treadle 141 switches the supply of preapplication liquid over to manifold 133. When the vehicle reaches the correct position to be washed by the apparatus, a treadle 151 operates a switch 152 to cause a valve 153 to cut off the preconditioner spray and energize drive motor 59 to initiate the first circuit of the carriage 32 around the vehicle on track 29.

As carriage 32 approaches the first corner, it encounters the first actuating element 34 which operates valving means 33 to change the spray pattern by switching the supply of liquid from manifold 47 to manifold 48 to wash the rear end of the vehicle 23. As carriage 32 completes its passage around the next corner, the second actuating element 34 again rotates star wheel 36, causing valving means 33 to switch the supply of liquid back to manifold 47. The same switching action from one manifold to the other is accomplished at the opposite end of track 29 as the carriage passes across the front end of the vehicle.

Upon completion of the first circuit around the track, cam 144 releases switch 143, causing the drive motor to double its speed. As the carriage passes star wheel 126, the valving means 112 is actuated to cut off the flow of detergent to the water being supplied to the spray means. As the carriage completes its first, high-speed rinse circuit, the valving system 112 is again operated so that spray wax, antispotting agent, or other liquids may be added to the rinse water, as desired, during the second rinse circuit. At the end of the second circuit, a cam 154, on shaft 122, operates a cutoff switch 156 to inactivate the various components and return them to condition to receive the next vehicle.

From the foregoing it will be seen that the automatic carwash apparatus described herein accomplishes an improved washing action automatically, the operating components of the apparatus being particularly suited to function reliably and avoid any requirement for an attendant.

I claim:
1. A washing apparatus, comprising
spray means formed for directing a spray of liquid against an object to be washed,
an oblong track formed for positioning in generally encircling relation to the object to be washed,
carriage means movable along said track and having said spray means mounted thereon so that said spray of liquid will traverse selected areas of the object to be washed, and
control means having an operative connection to said spray means and formed for causing said spray means to increase spraying action against desired portions of said selected areas of the object to be washed;
said control means including a valving system formed for varying the quantity of spray directed against said desired portions in response to the position of said spray means with respect to said object.

2. A washing apparatus as described in claim 1 and wherein said valving system is formed for actuation by movement of said carriage means past a predetermined station along said track.

3. A washing apparatus as described in claim 1 and wherein said spray means is formed for directing a plurality of liquids through said spray, and a second control means is provided responsive to said relative movement of said spray means and the object to be washed for causing said spray means to direct selected liquids in a predetermined sequence against said desired areas of the object to be washed.

4. A washing apparatus as described in claim 3 and wherein said second control means includes a second valving system adapted for selectively connecting said spray means to separate sources of said plurality of liquids, and said second valving means is formed for actuation by movement of said carriage means along said track.

5. A washing apparatus as described in claim 1 and wherein said spray means includes a plurality of sets of spray heads, and wherein said valving system is formed for supplying the liquid selectively to said sets of spray heads.

6. A washing apparatus as described in claim 5 and wherein each of said sets of spray heads comprises a manifold connected to said valving system, and a plurality of spray nozzles carried by and communicating with the manifold.

7. A washing apparatus as described in claim 1 and wherein said spray means is formed for directing a plurality of sprays of liquid against the object to be washed in an overlapping pattern, and said control means is formed to change said pattern at said desired portions of the object to be washed.

8. A washing apparatus as described in claim 1 and wherein said spray means is also formed for effecting reciprocating changing of the angle at which the spray of liquid is directed against the object to be washed.

9. A washing apparatus as described in claim 6 and wherein means is provided on said carriage means for oscillating said spray heads about the longitudinal axes of said manifolds for effecting said reciprocating changing of the angle at which the sprays of liquid are directed against the object to be washed.

10. A washing apparatus as described in claim 1 and wherein said valving system is formed for selective actuation by movement of said carriage means past predetermined stations along said track, whereby increased and decreased quantities of liquid will be sprayed selectively on desired portions of the vehicle between predetermined stations.

11. A washing apparatus as described in claim 10 and wherein an actuating element is supported in fixed position relative to said track, and said valving system is carried on said carriage means and is formed for interception and operation by said actuating element.

12. A washing apparatus as described in claim 11 and wherein said second valving system is supported in fixed position relative to said track, and said second actuating element is mounted on said carriage means in position for interception and actuation of said second valve means as said carriage means moves therepast.

13. A washing apparatus as described in claim 10 and wherein said valving system includes a rotary actuating shaft, a pair of valves connected to said spray means and operated by said shaft so that the valves are alternately actuated to open and closed positions by said shaft in such manner that one valve is open when the other is closed, opening of one of said valves being adapted to supply a larger volume of liquid to desired portions of said spray means than opening of the other valve, and a star wheel connected to said rotary actuating shaft and positioned to intercept said actuating element and be rotated a desired increment thereby as said star wheel moves therepast.

14. A washing apparatus as described in claim 12 and wherein said second valving system includes a second rotary actuating shaft, a plurality of cams on said second rotary actuating shaft, a plurality of cam-operated valves operatively associated with said cams and connected to said spray means, said cam-operated valves being adapted for individual connection to sources of desired liquids, and a second star wheel connected to said second rotary actuating shaft and positioned to intercept said second actuating element and be rotated a desired increment thereby as said carriage means moves past said second star wheel whereby said cam operated valves will supply desired liquids to said spray means in a predetermined sequence.

15. A washing apparatus as described in claim 1 and wherein electrically powered motive means is connected to said carriage means for effecting said relative movement, and wherein money acceptor means is formed for providing electrical current to said motive means in response to deposit of a predetermined amount of money in said money acceptor means, and wherein a treadle is positioned to be deflected by the weight of the object to be washed in position for washing, said motive means being inactivated unless said treadle is so deflected.

16. A washing apparatus as described in claim 1, and wherein a preapplication spray is mounted in the path of an object entering the washing apparatus for softening and loosening dirt thereon before operation of said spray means, said preapplication spray being responsive to movement of an object into operative position relative to said track.

17. A washing apparatus as described in claim 16 and wherein said preapplication spray includes a control device responsive to the presence of an object for operating said preapplication spray only when an object is in position to be impinged thereby.

18. A washing apparatus as described in claim 1 and wherein said control means is formed for causing said carriage means to make a washing trip around the object to be washed followed by a plurality of rinsing trips, said control means being effective to cause said motive means to drive said carriage means at a higher rate of speed during the rinsing trips than during the washing trip.